J. W. DIXON.
PNEUMATIC WHEEL.
APPLICATION FILED MAY 20, 1922.
1,431,878. Patented Oct. 10, 1922.
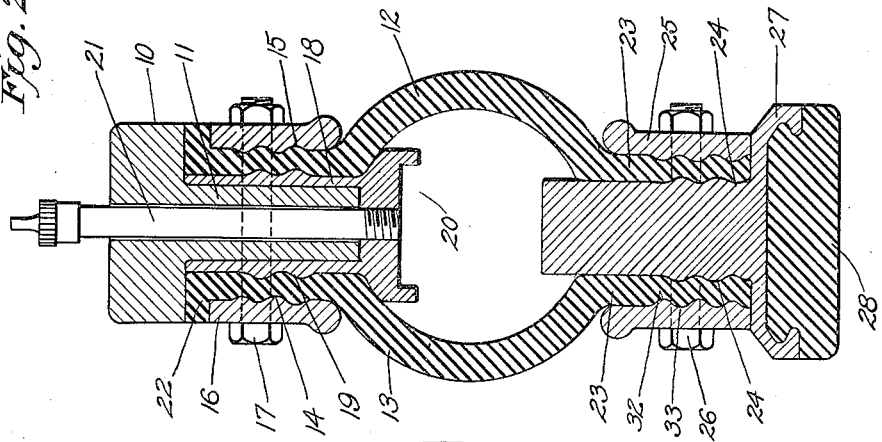
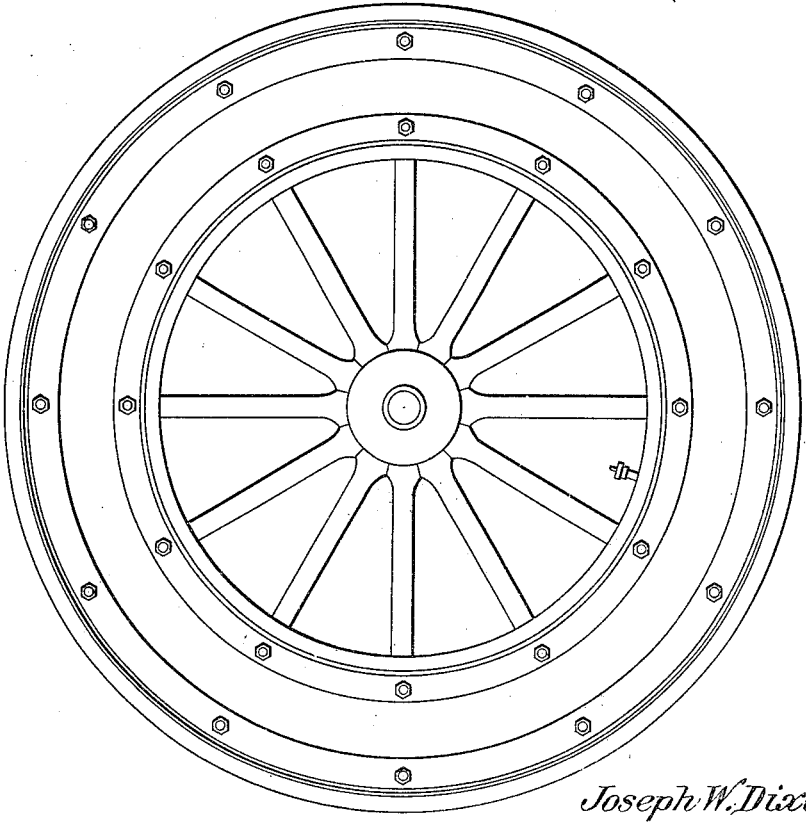
Joseph W. Dixon
INVENTOR
BY Victor J. Evans
ATTORNEY
R. E. Wise
WITNESS:

Patented Oct. 10, 1922.

1,431,878

UNITED STATES PATENT OFFICE.

JOSEPH W. DIXON, OF CONNELLSVILLE, PENNSYLVANIA.

PNEUMATIC WHEEL.

Application filed May 20, 1922. Serial No. 562,414.

*To all whom it may concern:*

Be it known that I, JOSEPH W. DIXON, a citizen of the United States, residing at Connellsville, in the county of Fayette and State of Pennsylvania, have invented new and useful Improvements in Pneumatic Wheels, of which the following is a specification.

This invention relates to pneumatic wheels, and aims to simplify the general construction illustrated in my Patent 1,411,879, the present invention residing in the construction, combination, and arrangement of parts as claimed.

In the drawing forming part of this application, like numerals of reference indicate similar parts in the several views, and wherein:—

Figure 1 is a side view of a wheel constructed in accordance with the present invention.

Figure 2 is a vertical sectional view therethrough.

Referring to the drawing in detail, 10 indicates the felly of the wheel, which is formed to provide a reduced annular portion 11 which projects inwardly from the inner periphery of the felly as clearly shown in Figure 2. The pneumatic tire is made up of two sections 12 and 13 respectively, and these sections are arranged at the opposite sides of the reduced portion 11 of the felly. The corresponding portions of the sections which are thus arranged at the opposed sides of the portion 11 of the felly are corrugated as at 14, and these corrugations 15 formed on the inner faces of clamping plates 16 of annular formation, which engage the respective sections 12 and 13 of the tire. The plates 16 are secured together by means of bolts 17 which are passed through the plates and also through the tire sections as shown in Figure 2. Interposed between the reduced portion 11 of the felly and the adjacent portions of the tire sections is a metallic member 18 of substantially U-shaped formation in cross section, and this member straddles the reduced portion 11 of the felly and is secured thereto by means of the fastening bolts 17. The parallel portions of this metallic member are corrugated as at 19 to accommodate themselves to the adjacent corrugations 15 of the tire sections. The metallic members 18 projects an appreciable distance beyond the reduced portion 11 of the felly, and is formed with a recess 20 for a purpose to be hereinafter described. Manifestly, the construction thus far described is such that the tire is effectively secured to the felly. The valve tube 21 is passed through a suitable opening in the felly and has its lower end threaded into an opening in the curved portions of the metallic member 18. The tire sections 12 and 13 are also formed to provide lateral flanges or out-turned portions 22 which are impinged between the inner periphery of the felly 10, and the clamping plates 15.

The corresponding portions 23 of the tire sections are clamped between the reduced portion 24 of the tire rim and the clamping plates of annular formation indicated at 25, and these members are all held together by means of fastening bolts 26. The portion 24 extends beyond the plates 25 and is shaped to define the rim 27 which supports a solid rubber tread 28. The portion 24 is extended within the tire and shaped to accommodate itself to the recess 20 of the member 18 when these parts are brought together. The corresponding portions 22 of the tire sections are corrugated as at 32 to cooperate with the corrugations 33 so that the tire is effectively clamped to the adjacent parts as shown. The tire is inflated through the valve tube 21, and the tire sections 12 and 13 distended beyond the sides of the clamping plates 15 and 25 respectively, as shown in Figure 2. This portion of the wheel provides the necessary cushion so that the wheel actually possesses all the resiliency of a pneumatic tire, but by reason of the use of a solid tread portion 28, it is manifest that the tire cannot be very easily punctured. Should however, the pneumatic portion of the tire be punctured, the recessed portion 20 of the metallic member 18 will move in the direction of the solid tread member 28, and repose upon the reduced portion 24 of the rim 27 to permit continued use of the wheel, until time is found to repair the tire without injuring the same.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A wheel of the character described comprising a felly having a reduced annular portion projecting from the outer periphery thereof, a pneumatic tire including two members arranged at the opposite sides of the said annular portion, a substantially U-shaped member straddling said annular portion and arranged between the latter and the tire section, means for securing all of said parts together, a solid tread member, a rim supporting the tread member and having a portion secured between the tire section, and means for inflating the tire.

2. A wheel of the character described comprising a felly having a reduced portion projecting from the outer periphery thereof, a metallic member straddling said reduced portion and shaped to a recess, a tire including two sections arranged at the opposite sides of the reduced portion of the felly, for contacting said metallic member, clamping plates bearing against said tire sections, bolts passed through said parts to hold the latter associated, the contacting parts being correspondingly corrugated, flanges formed on the tire sections and impinged between the clamping plates and the inner periphery of the felly, a solid tread member, a rim therefor, said rim including a reduced portion secured between said tire sections and designed to be received by said recess, and means for inflating the tire.

3. A wheel of the character described comprising a felly having a reduced portion projecting from the outer periphery thereof, a pneumatic tire including two members arranged at the opposite sides of the reduced portion of the felly, clamping plates engaging said tire members, a substantially U-shaped member straddling the reduced portion of the felly and interposed between the latter and the tire members, fastening bolts securing said parts together, said metallic member being designed to provide a recessed portion arranged within the tire, a solid tread member, a rim supporting said tread member, and having a reduced portion arranged between the tire members, clamping plates engaging the outer sides of the tire members, bolts for clamping these parts together, said reduced portion of the rim being disposed to be received by said recessed portion of said member, and means for inflating said tire.

In testimony whereof I affix my signature.

JOSEPH W. DIXON.